United States Patent [19]
Murtagh

[11] Patent Number: 5,141,686
[45] Date of Patent: Aug. 25, 1992

[54] METHOD FOR PRODUCING CORDIERITE ARTICLES

[75] Inventor: Martin J. Murtagh, Trumansburg, N.Y.

[73] Assignee: Corning Incorporated, Corning, N.Y.

[21] Appl. No.: 274,398

[22] Filed: Nov. 21, 1988

[51] Int. Cl.$^5$ ............................................. C04B 35/14
[52] U.S. Cl. ..................................... 264/56; 501/118; 501/119
[58] Field of Search .................... 264/56; 501/119, 118

[56] References Cited

U.S. PATENT DOCUMENTS 4,280,845 7/1981 Matsuhisa .............................. 264/66
4,851,376 7/1989 Asami et al. ........................ 501/119

Primary Examiner—James Derrington
Attorney, Agent, or Firm—Gary H. Levin; Richard N. Wardell

[57] ABSTRACT

A method of preparing a precursor or cordierite-forming particulate raw material mixture is improved upon by characterizing the talc particles utilized in the raw material mixture in accordance with a Morphology X-ray Diffraction Index or the surface area of the talc particles. Talc particles having a predetermined or desired Morphology X-ray Diffraction Index or surface area are utilized in preparing the raw material mixture. A cordierite article is produced having pores therethrough, which pores have shapes that are "blocky" or "platy" as a result of the talc morphology. "Platy" pores in the fired cordierite article result in higher Water Absorption values and an increase in coatability by high surface area washcoat and catalyst; conversely, "blocky" pores result in lower Water Absorption values and a decrease in coatability by high surface area washcoat and catalyst.

11 Claims, 13 Drawing Sheets

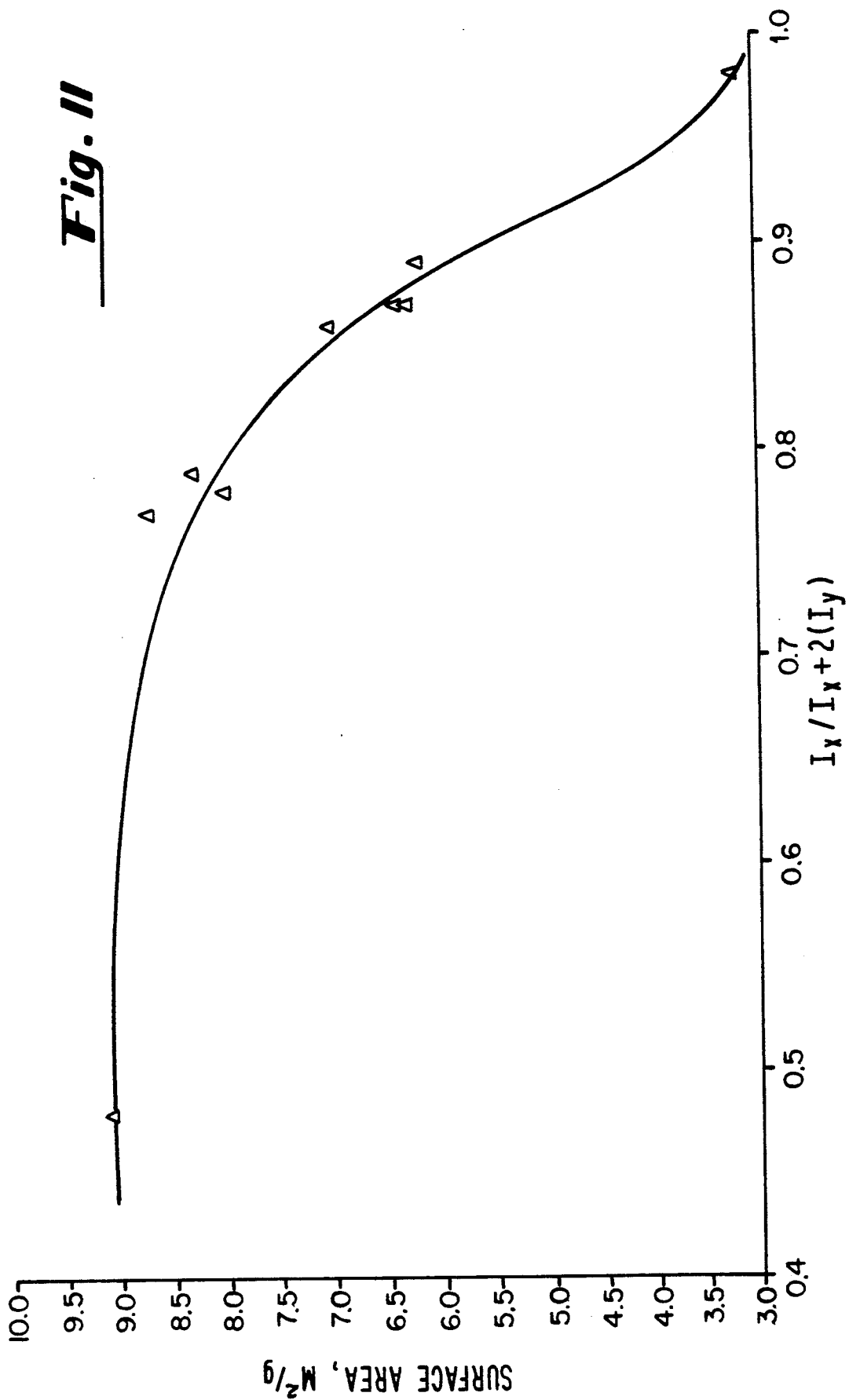

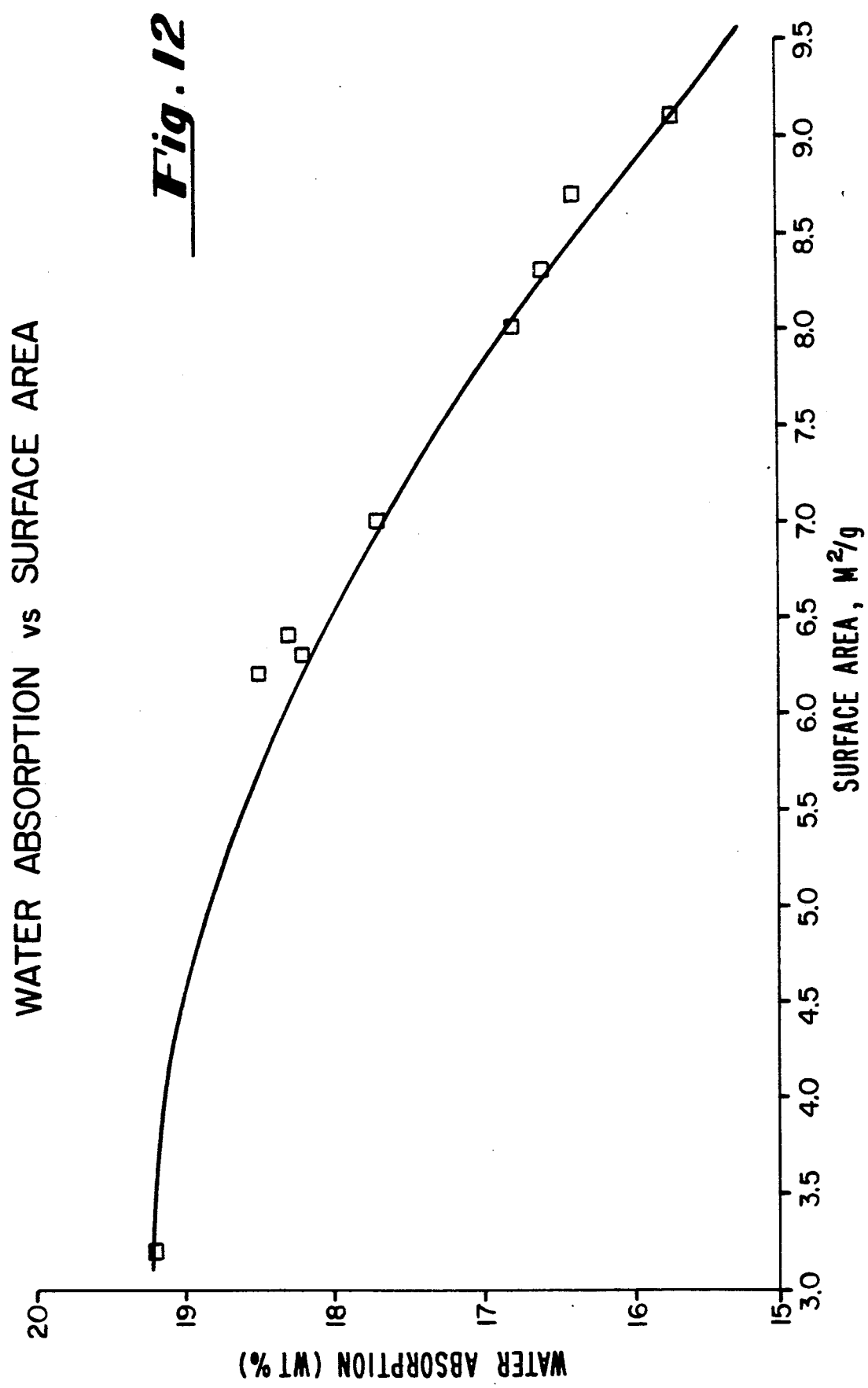

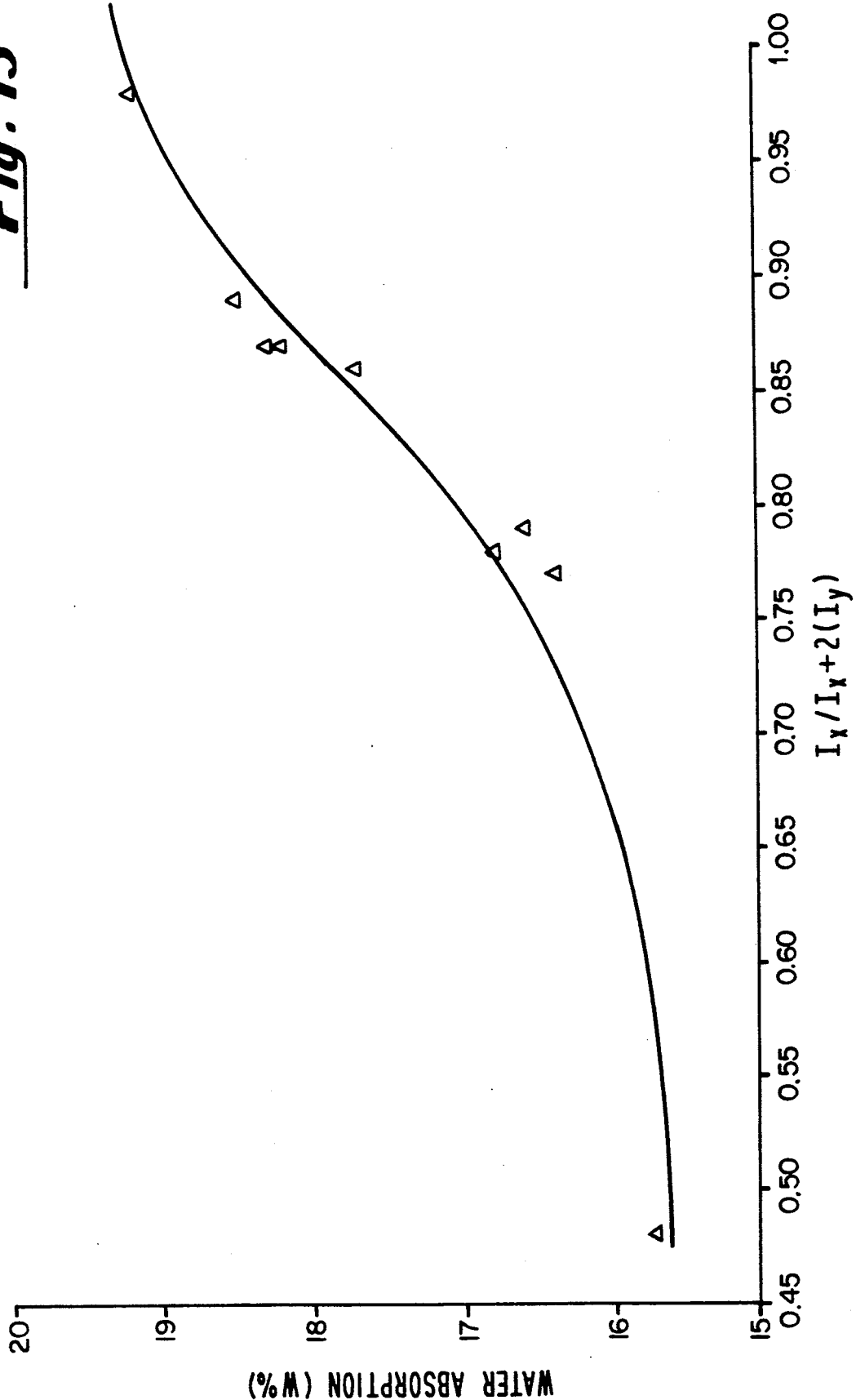

WATER ABSORPTION vs SURFACE AREA

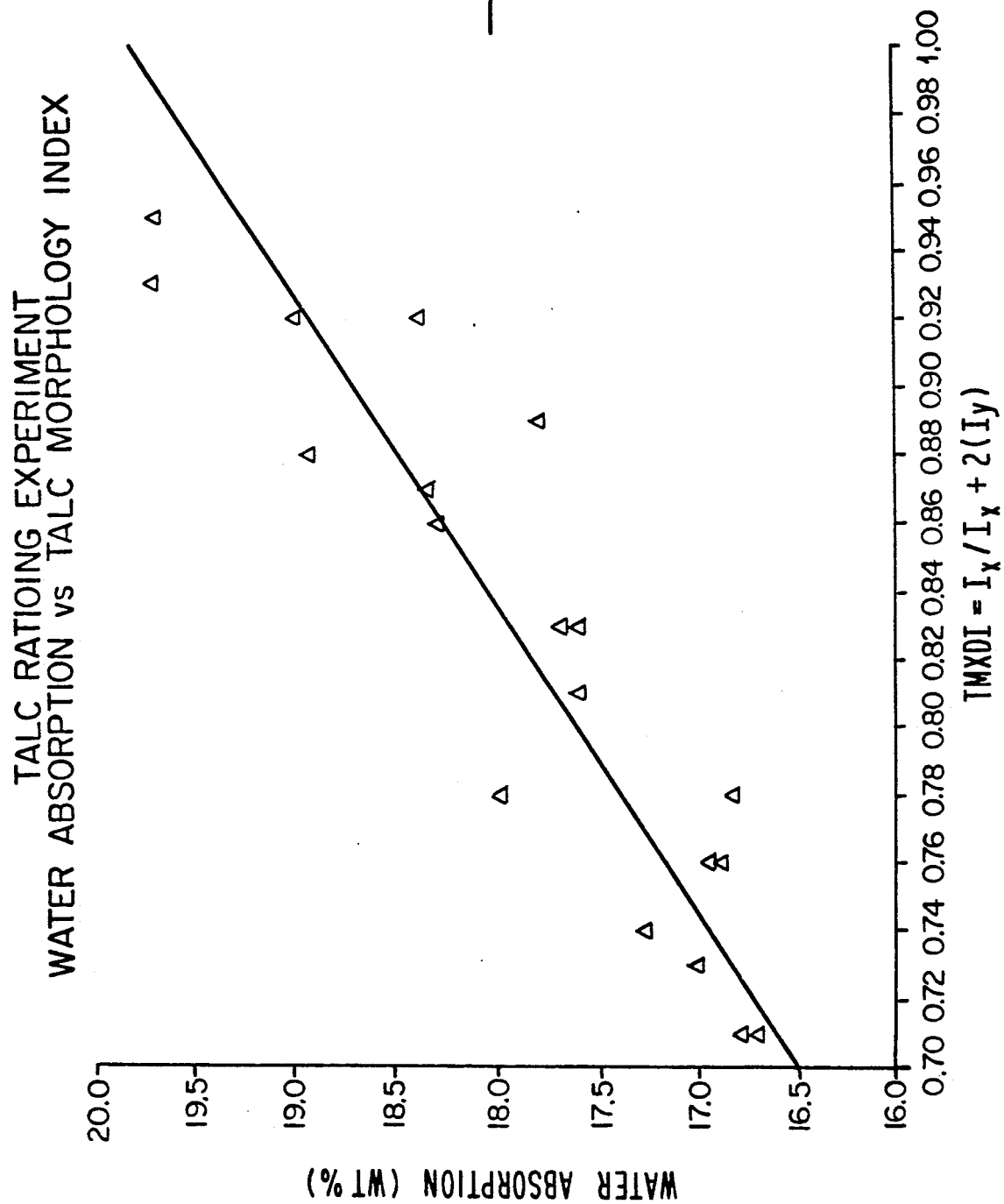

METHOD FOR PRODUCING CORDIERITE ARTICLES

BACKGROUND OF THE INVENTION

The present invention relates to cordierite ceramic and more particularly to an improved method of preparing a precursor or cordierite-forming, particulate raw material mixture, which mixture is useful in making cordierite articles of widely-differing profiles and shapes.

Cordierite ceramic has, among other structural, physical and chemical properties, excellent high temperature capability, chemical durability and resistance to thermal shock, vibration and corrosion. These properties permit the use of cordierite ceramic in a large number of environments and applications, as for example, in filters for fluids, both liquids and gases, as heat exchangers, nozzles, protective linings and as catalyst support members in apparatus for purifying hydrocarbons, carbon monoxide and nitrogen oxide in various exhaust gases.

In general, cordierite ceramic articles are formed by preparing a particulate raw material mixture containing magnesia, alumina, and silica (or their pre-cursors); forming the raw material mixture in a desired configuration; and thereafter sintering or firing the desired configuration to produce the cordierite article. U.S. Pat. Nos. 3,919,384 and 4,551,295, assigned to the same assignee as the subject application, relate, among other things, to the manufacture of cordierite ceramic extruded articles of various geometries.

It is well understood by those skilled in the art that variations in the batch raw materials (i.e. particle size, particle shape, and chemistry of the various raw materials) will introduce product variability in the fired cordierite article. That is, the physical properties of the fired cordierite article will in large part be dependent on the structural, physical, and chemical properties of the batch raw materials.

Consequently, depending on the characteristics of the raw materials which, in turn, are many times dependent on the sources of the raw materials, there will be finished product variations, even though all other process parameters are kept the same.

Two physical properties of cordierite ceramic of particular interest are water absorption and catalyst coatability. With a view of improving both of these properties, the inventor undertook an investigation of the precursor batch raw materials of cordierite ceramic.

It was during a study of the role of the various precursor or cordierite-forming raw materials that the inventor implemented a set of experiments to investigate the role of the magnesia precursor therein. Toward this end, the inventor implemented a set of experiments to examine in detail the specific magnesia precursor talc ($3MgO.4SiO_2.H_2O$). These talc experiments examined the effect, if any, that different talc morphologies have on the physical properties of fired cordierite articles and their water absorption and catalysis coatability properties.

After intensive study, the inventor found that there is a relationship between talc particle morphology, i.e., talc particle surface area, and water absorption values of fired cordierite articles as well as its catalysis coatability.

As will be explained more fully hereinafter in the Detailed Description of the Invention, the inventor developed a Talc Morphology X-ray Diffraction Index, hereinafter alternatively referred to as "TMXDI" or "Index", to quantify talc particle morphology.

It may be explained here that talc particles are sometimes characterized in the prior art as tabular or "platy", or as stone-like or "blocky", depending upon the physical appearance or structure of the talc particles. Such "platy" or "blocky" character, in large part, depends on the source of the ore and the manner in which the ore is processed. As for example, when talc is broken, it can break into sheet-like structures or plate shaped particles along the basal planes (001) which are parallel to the sheet-like or plate shaped particles and perpendicular to the c-crystallgraphic axis. Generally, as the "platy" character of talc particles increases, the particle surface area decreases.

The TMXDI developed by the inventor is a measure of the "platy" character of the talc particles. The TMXDI increases as the talc approaches a more "platy" morphology and can be used to verify variability in the talc surface area. The inventor has determined that there is a direct relationship between water absorption in the fired ceramic cordierite article and the TMXDI, and that there is an inverse relationship of water absorption in the fired ceramic cordierite article to surface area of the precursor talc particles.

Consequently, by characterizing the talc particles in accordance with surface area or with the TMXDI of the present invention, the make-up of the batch raw materials can be more effectively controlled. Use of talc particle surface area or the TMXDI also provides a means to blend talc particle from different sources and suppliers to obtain uniform properties from one production lot to the next. Such control and blending can be a very valuable technique for controlling variability of specific physical properties of the fired ceramic cordierite article, viz., water absorption and catalysis coatability. These factors together with others which will become apparent, are indicative of the invention's advantages.

SUMMARY OF THE INVENTION

The present invention provides an improved method for producing cordierite articles. The general method comprises (a) preparing a particulate raw material mixture comprised of magnesia, alumina and silica precursors; (b) forming the raw material mixture into a desired configuration; and thereafter (c) firing the configuration to produce a cordierite article. The improvement comprises (i) selecting talc particles as the magnesia precursor in said particulate raw material mixture; (ii) characterizing the talc particles in accordance with the talc particles surface area or the Talc Morphology X-ray Diffraction Index (TMXDI); (iii) selecting talc particles having a predetermined or desired surface area or TMXDI value; and, (iv) utilizing the talc particles selected in step (iii) in preparing the raw material mixture of step (a).

A fired cordierite article is produced in accordance with the invention having pores therethrough which are "platy" or "blocky" in shape. When using the terms "platy" or "blocky" herein in reference to the shape of pores, these terms are used in the same manner as when solid particles are characterized as "platy" or "blocky", i.e. the structure or physical appearance of the pores are "platy" or "blocky" in shape.

In a first embodiment of the invention, the TMXDI is equal to the ratio of (i) a first preselected amplitude of the intensity of a first diffraction plane of an x-ray diffraction pattern of the talc particles; to, (ii) a second preselected amplitude of the intensity of a second diffraction plane on the same x-ray diffraction pattern.

In a second embodiment of the invention, the TMXDI is equal to the ratio of (i) a first preselected amplitude of the intensity of a first diffraction plane of an x-ray diffraction pattern of the talc particles; to, (ii) the sum of a) the first preselected amplitude and b) two times a second preselected amplitude of the intensity of a second diffraction plane on the same x-ray diffraction pattern.

In both the first and second versions of the TMXDI, the preferred first and second diffraction planes are the (OOl) and (OkO) diffraction planes, respectively, where l and k are integers and preferably, 4 and 2 respectively. The preferred first and second preselected amplitude of the intensities of the first and second diffraction planes are the peak amplitudes of the intensities of the first and second diffraction planes, respectively.

Other advantages and features of the invention will become apparent, and a more complete understanding of the invention will be had, with reference to the following Brief Description of the Drawings and Detailed Description of the Invention.

BRIEF DESCRIPTION OF THE DRAWINGS

FIG. 11 is a graph of talc particle surface area (Col. W-Table 1) versus TMXDI values (Col. Y-Table 1) in accordance with a second embodiment of the invention;

FIG. 12 is a graph of cordierite water absorption value (Col. Z-Table 1) versus talc surface area of column W of Table 1;

FIG. 13 is a graph of cordierite water absorption values (Col. Z-Table 1) versus the TMXDI values of column Y of Table 1;

FIG. 15 is a graph of cordierite water absorption values (Col. Z-Table 3) versus a TMXDI (Col. Y of Table 3) showing a range of TMXDI values for a given range of water absorption values.

DETAILED DESCRIPTION OF THE INVENTION

Hereinafter, the present invention will be explained in detail based on experiments and correlation of data and observations made during such experiments.

It was first observed during water absorption tests that samples of cordierite articles manufactured at different times produced varying water absorption values. The water absorption of a cordierite article is reported as the weight percent for the average of ten samples. The procedure is as follows. The samples are weighed dry and then saturated with water at ambient temperature and pressure. The excess water is blown off the samples. The saturated samples are then weighed and the water absorption is calculated from the two weights of each sample. It may be explained here that water absorption in cordierite articles is utilized as a monitor of catalyst coatability of cordierite articles; the higher the water absorption capability of the cordierite article, the greater the catalyst coatability of the cordierite article. This observation of differences of water absorption values lead to an overall examination of the raw materials used in the production of the cordierite articles. Typically, in the preparation of cordierite articles talc particles are mixed in proportion with clay and a source of alumina to provide the raw material mixture with an analytical composition by weight percent: talc 36% to 52%; kaolin 43%–49%; and alumina 13%–24% and, on analytical oxide basis of 11.5%–16.5% MgO; 33%–41% $Al_2O_3$; and 46%–53% $SiO_2$ as described in U.S. Pat. No. 3,887,977 assigned to the same assignee as the subject application. As part of this overall examination, it was determined that different talc particles were utilized in some of the cordierite articles which had varying water absorption properties. Consequently, a study was undertaken of the role of talc particles in the batch raw materials. As a part of this study, extruded greenware (unfired cordierite ceramic) was examined.

Figure 1:
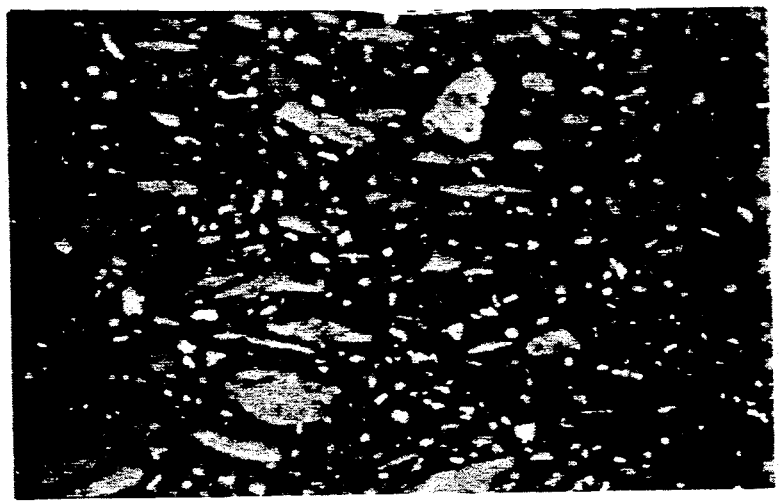
FIG. 1 is a Scanning Electron Microscopy (SEM) photomicrograph (500 magnification) in the perpendicular direction (axial) of a polished section of extruded greenware produced from a particulate raw material mixture containing a first blend of talc particles (Talc Sample 7 of Table 1)

With reference to FIG. 1, there is shown a Scanning Electron Microscopy (SEM) photomicrograph (500 magnification) of a polished section of extruded greenware produced from a particulate raw material mixture containing talc particles of Talc Sample 7 of Table 1. Talc Sample 7 comprises a blend of talc particles. It should be noted that fired cordierite articles produced from raw materials containing talc particles of Talc Sample 7 had relatively high water absorption capability.

Figure 3:
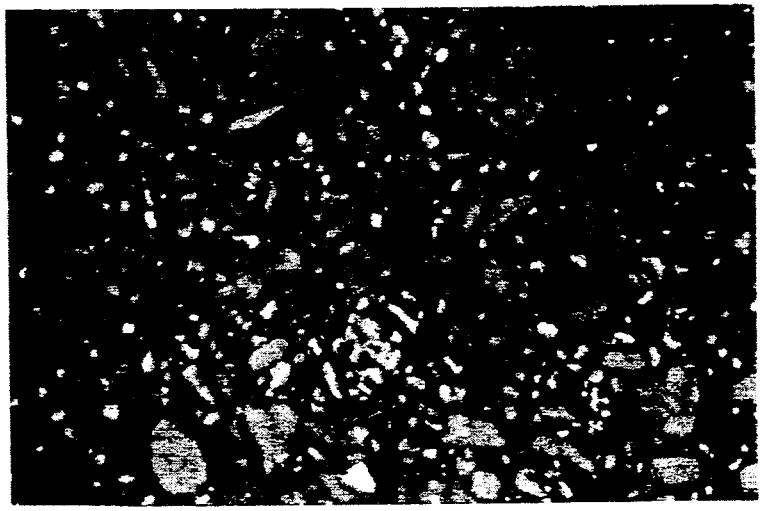
FIG. 3 is an SEM photomicrograph (500 magnification) in the perpendicular direction of a polished section of extruded greenware produced from a particulate raw material mixture containing a second blend of talc particles (Talc Sample 3 of Table 1)

With reference to FIG. 3, there is shown a SEM photomicrograph (500 magnification) of a polished section of extruded greenware produced from a particulate raw material mixture containing talc particles of Talc Sample 3 of Table 1. Talc Sample 3 is similar to Talc Sample 7 in origin but is not a blend. It should be noted here that fired cordierite articles produced from materials containing talc particles of Talc Sample 3 had lower water absorption capability than that produced from raw materials containing talc particles of Talc Sample 7. In particular, the cordierite resulting from the fired greenware of FIG. 1 had a Water Absorption value of 18.5 weight percent and the cordierite resulting from the fired greenware of FIG. 3 had a Water Absorption value of 16.6 weight percent.

In comparing FIG. 1 with FIG. 3, it was seen that the talc particles of FIG. 1 were more "platy" than those talc particles seen in FIG. 3 which were seen to be more "blocky".

In order to determine if the talc particle morphology difference seen in FIGS. 1 and 3 were due to extrusion direction effects, SEM photomicrographs of the extruded greenware were taken in both the axial direction (FIGS. 2 and 4) and the transverse or perpendicular direction as shown in FIGS. 1 and 3. Again, it was seen that the talc particles of FIG. 2 were more "platy" than those seen in FIG. 4. It was therefore concluded that the morphology differences observed between the greenware of FIGS. 1 and 2 and the greenware of FIGS. 3 and 4 were not due to extrusion direction effects.

Figure 2:
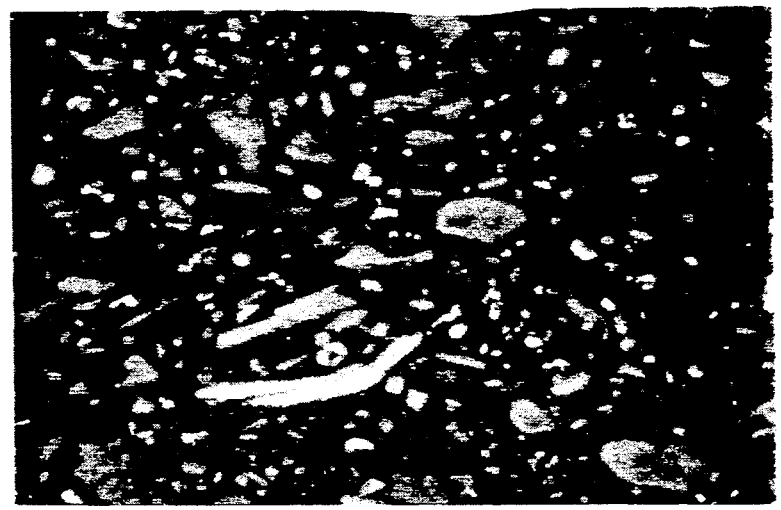
FIG. 2 is an SEM photomicrograph (500 magnification) of a polished section of the same extruded greenware of FIG. 1 but in the parallel direction (transverse)
Figure 4:
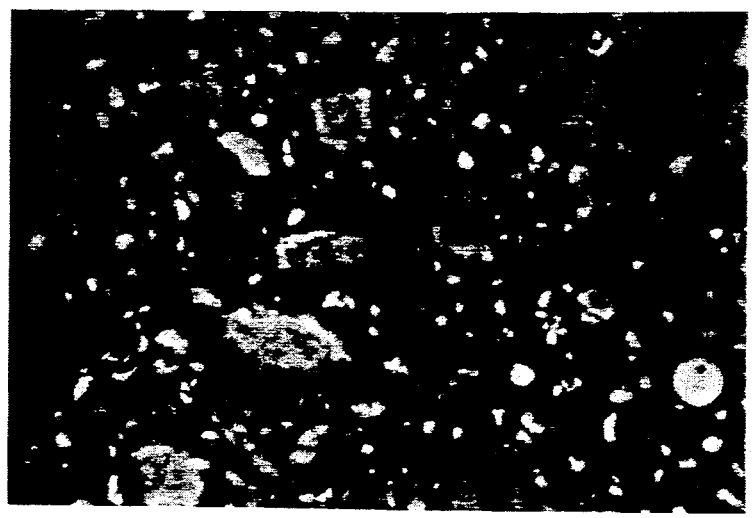
FIG. 4 is an SEM photomicrograph (500 magnification) of a polished section of the same extruded greenware of FIG. 3 but in the parallel direction.

The "platy" versus "non-platy" character observed in the extruded greenware, i.e. FIGS. 1 and 2 versus FIG. 3 and 4, is related to differences in the pore shape or morphology, interconnectivity and accessibility of the porosity during water absorption analysis of the fired ware. It has now been determined that a "platy" particle morphology in the talc will translate to a more highly interconnected network of porosity in the fired ware due to the "platy" talc's tendency to orient during extrusion; this results in "platy" shaped pores and higher water absorption values (due to a more extensive capillary effect of the "platy" shaped pores). Conversely, as the "platy" morphology of the talc decreases, i.e. becomes more "blocky", the porosity becomes more isolated in the fired ware. The "blocky" talc is less likely to orient during extrusion, leading to "blocky" shaped pores, less interconnectivity and accessibility of the porosity of the fired ware by the water, resulting, in turn, in lower water absorption values.

From the foregoing observations, the inventor was lead to a further examination of the effect of changes in talc particle morphology on the water absorption capabilities of fired cordierite articles.

A number of different talcs were examined by Scanning Electron Microscopy. Table 1 is a listing of the talcs examined. The morphologies of the talcs examined were found to range from "blocky" (Talc Sample 1) to "platy" (Talc Sample 9).

For the sake of brevity, only the two end members, namely, Talc Sample 1 and Talc Sample 9 will be discussed. Talc Sample 1 comprises 100% "blocky" talc and Talc Sample 9 comprises 100% "platy" talc. Photomicrographs from these two materials FIGS. 5 and 5(a) and FIGS. 7 and 7(a), respectively, show a clear difference in morphology.

Figure 5:
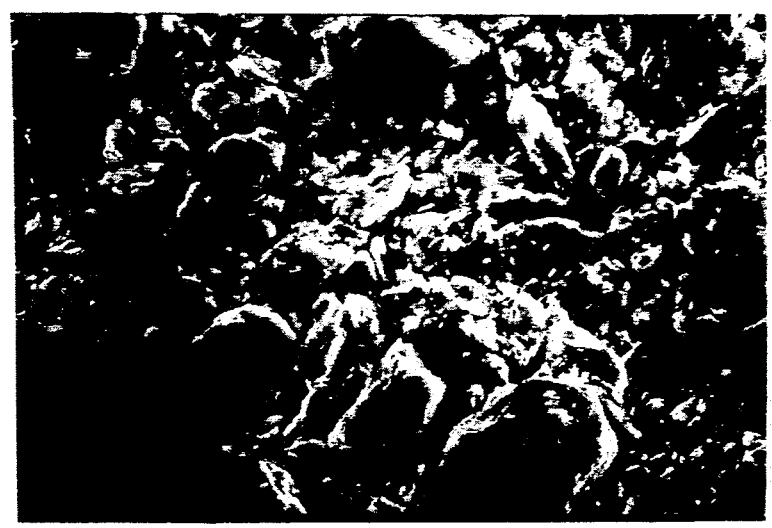
FIGS. 5 and 5(a) are SEM photomicrographs (500 magnification and 2000 magnification, respectively) of talc particles of Talc Sample 1 of Table 1 of the subject application.
Figure 7:
FIG. 7 and 7(a) are SEM photomicrographs (500 magnification and 2000 magnification, respectively) of talc particles of Talc Sample 9 of Table 1.

Although both sets of photomicrographs (FIGS. 5 and 5(a) and FIGS. 7 and 7(a)) show that the talc particles possess a laminar morphology, in the case of Talc Sample 9 the laminates are tabular, whereas in the case of Talc Sample 1 they appear to be quite foliated. At low magnification (500×; FIG. 5) the Talc Sample 1 gives a "blocky" or eroded stone-like appearance whereas the Talc Sample 9 at low magnification (500×; FIG. 7) gives a "platy" or peanut brittle-like appearance.

Figure 5A:
Figure 7A:

At higher magnification (2000×; FIGS. 5(a) and 7(a)), it can be seen that the morphology of the two types of talcs is related to the differences in surface area. The foliated morphology of the Talc Sample 1 provides much more available surface than does the more tabular morphology of the Talc Sample 9. The measured surface area of the various Talc Samples of Table 1 is also shown in column W of Table 1. It will be noted that Talc Sample 1 has the highest surface area and that the surface area values go down (moving from top to bottom of column W of Table 1) with Talc Sample 9 having the lowest surface area.

It will also be noted that the "platy" character of the talcs of Table 1 increases as the surface area decreases. This inverse relationship can be correlated to the observation made above in reference to FIGS. 1–4. It will be recalled that the talc particles in the greenware produced from raw materials containing Talc Sample 7 were more "platy" than the talc particles in greenware produced from Talc Sample 3. Furthermore, it will be recalled that the fired cordierite articles produced from Talc Sample 7 had relatively higher water absorption capability than the fired cordierite articles produced from Talc Sample 3. Consequently, the correlation of the talc particle surface area with the extruded greenware water absorption capability, shows an inverse relationship of water absorption capability to the surface area of the talc particles.

Figure 5B:
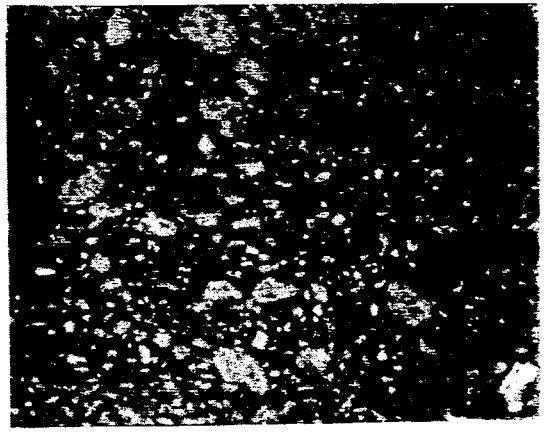
FIG. 5(b) is an SEM photomicrogrpah (250 magnification) in the perpendicular direction of a polished section of extruded greenware produced from a third blend of talc particles (Talc Sample 1 of Table 1)
Figure 5C:
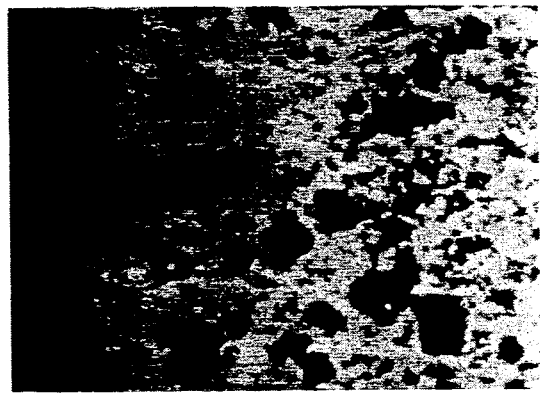
FIG. 5(c) is an SEM photomicrograph (250 magnification) in the perpendicular direction of a polished section of extruded fired ware produced from the third blend of talc particles (Talc Sample 1 Table 1)

With reference to FIGS. 5(b) and 5(c), 5(b) being a SEM of the greenware produced from raw material containing Talc Sample 1 of Table 1 and 5(c) being a SEM of the ware produced from the greenware of FIG. 5(b), it can be seen that the space occupied by large "blocky" talc particles (white in the green state of FIG. 5(b)) become the "blocky" shaped pores (black in FIG. 5(c)) in the fired ware shown in FIG. 5(c); i.e., the "blocky" shaped pores of FIG. 5(c) are the mirror image of the talc particles of FIG. 5(b). The fired article shown in FIG. 5(c) has a surface area of 0.27 m²/g at a firing temperature of 1390° C.

Figure 7B:
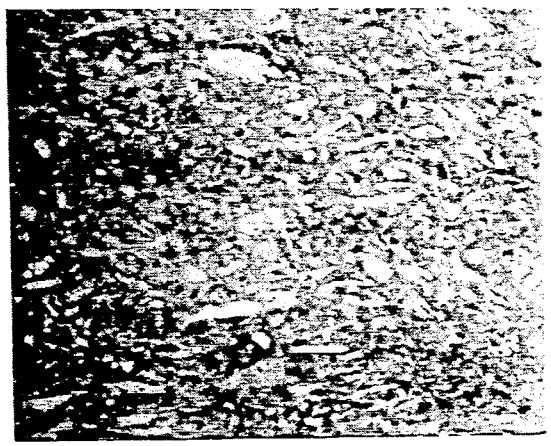
FIG. 7(b) is an SEM photomicrograph (250 magnification) in perpendicular direction of a polished section of extruded greenware produced from a fourth blend of talc particles (Talc Sample 9 of Table 1)
Figure 7C:
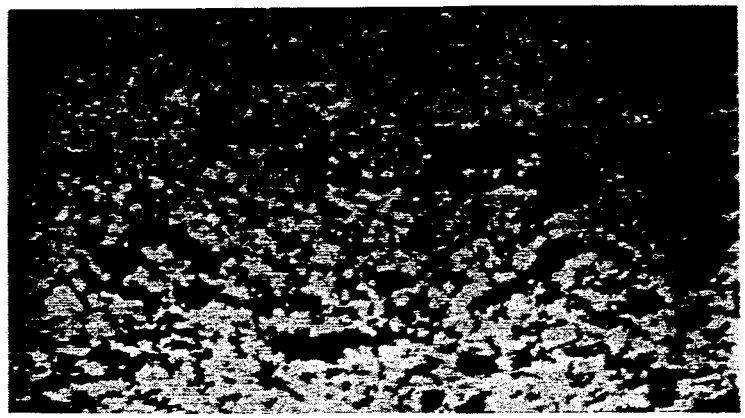
FIG. 7(c) is an SEM photomicrograph (250 magnification) in the perpendicular direction of a polished section of fired ware produced from the fourth blend of talc particles (Talc Sample 9 of Table 1)

With reference to FIGS. 7(b) and 7(c), 7(b) being a SEM of the greenware produced from raw material containing Talc Sample 9 of Table 1 and 7(c) being a SEM of the fired ware produced from the greenware of FIG. 7(b), it can be seen that the space occupied by large "platy" talc particles (white in the green state of FIG. 7(b)) become the "platy" shaped pores (black in FIG. 7(c)) in the fired ware shown in FIG. 7(c); i.e., the "platy" shaped pores of FIG. 7(c) are the mirror image of the talc particles of FIG. 7(b). The fired article shown in FIG. 7(c) has a surface area of 0.41 m²/g at a firing temperature of 1390° C.

It may be pointed out here that the surface area of a fired article is a result of the porosity of the fired article. In the case of "blocky" pores, the fired article surface area can range from 0.3 m²/g at a firing temperature of 1350° C. to 0.1 m²/g at a firing temperature of 1450° C. A preferable firing temperature is 1390° C. and at this temperature the surface area of the fired article is not less than 0.2 m²/g. An aspect ratio, i.e. length divided by thickness, for "blocky" pores would range from 0.8 to 1.2. With regard to "platy" pores, the fired article surface area can range from 1.0 m²/g at a firing temperature of 1350° C. to 0.3 m²/g at a firing temperature of 1450° C. At the preferable firing temperature of 1390° C., the surface area of the fired article is not greater than 0.6 m²/g. An aspect ratio for "platy" pores would be equal to or greater than 2.

In summary of the foregoing, it has been determined that the greater the interconnectivity and accessibility of the porosity (due to a more extensive capillary effect) in the fired cordierite ceramic, the higher is the water absorption capability of such fired cordierite ceramic. And, the greater interconnectivity and accessibility of the porosity in the fired ware is effected by inclusion of talc particles with a "platy" morphology (or with a lower surface area), as shown in FIGS. 7(b) and 7(c). Therefore, water absorption is directly related to the "platy" character of the talc particles and inversely related to the surface area of the talc particles chosen for use in the batch raw material.

Figure 6:
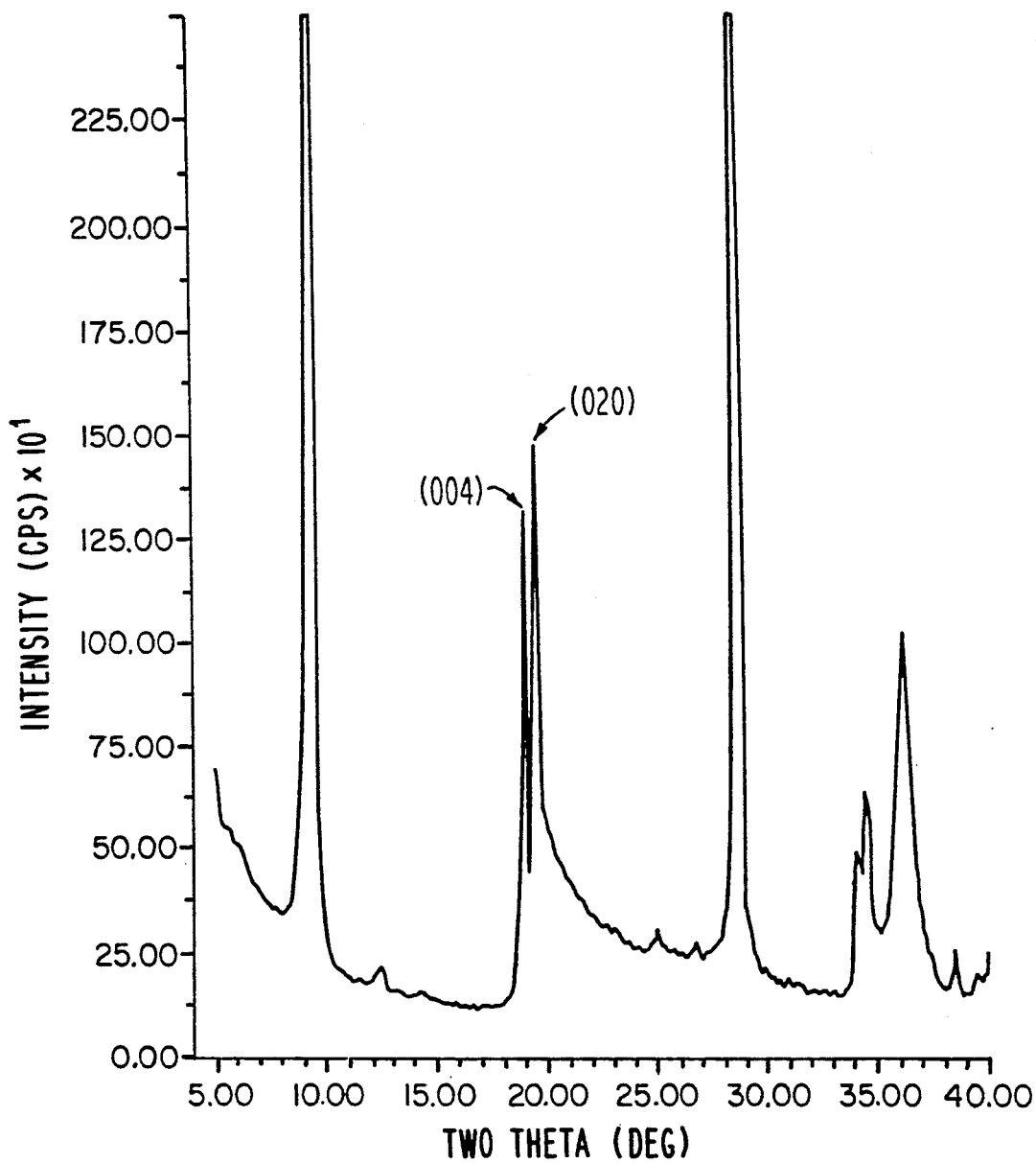
FIG 6 is a partial x-ray diffraction pattern of the talc particles of FIGS. 5 and 5(a)
Figure 8:
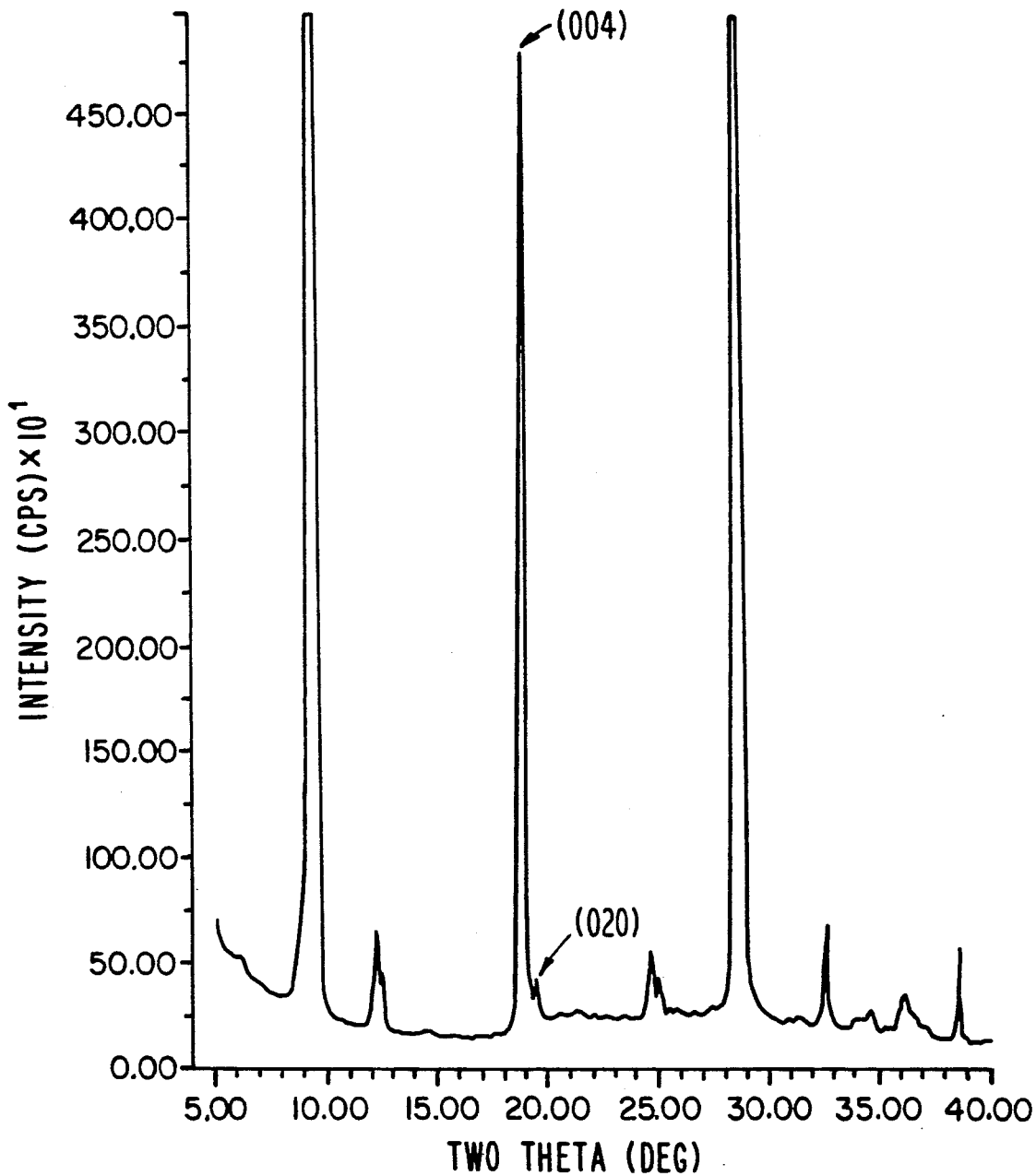
FIG. 8 is a partial x-ray diffraction pattern of the talc particles of FIGS. 7 and 7(a)

In order to further characterize talc particle morphology, a series of x-ray diffraction patterns of the talcs of Table 1 were studied. Again for the sake of brevity, only the x-ray diffraction patterns for the end members, namely, Talc Sample 1 (FIGS. 5 and 5(a)) and Talc Sample 9 (FIGS. 7 and 7(a)) are presented. FIG. 6 is a partial x-ray diffraction pattern of Talc Sample 1 and FIG. 8 is a partial x-ray diffraction pattern of Talc Sample 9. From these x-ray diffraction patterns the Morphology X-ray Diffraction Index in accordance with the invention was developed to quantify talc particle morphology as shown by the SEM photomicrographs.

Figure 9:
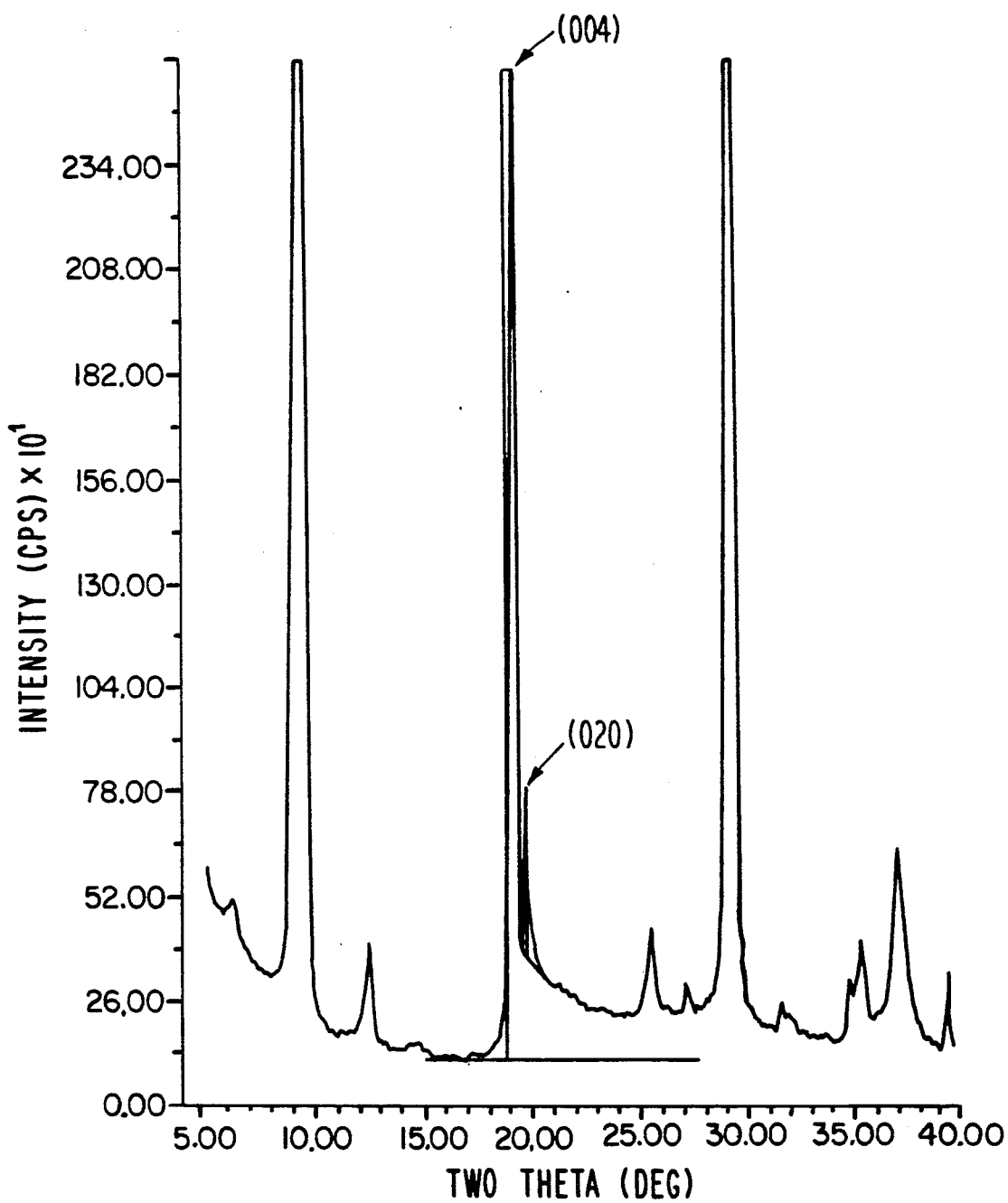
FIG. 9 is a partial x-ray diffraction of the Talc Sample 3 of Table 1 showing the peaks of the amplitudes of the intensities of the diffraction planes used for obtaining the TMXDI in accordance with the invention.

Referring now to FIG. 9, there is shown a partial x-ray diffraction pattern of Talc Sample 3 of Table 1 showing the peaks of the amplitudes of the intensities of the diffraction planes used for obtaining the TMXDI in accordance with the invention. The planes chosen for obtaining the Index were the (004) and the (020) planes. The (004) plane (degree two theta equals 18.80 Cu K-alpha, d-spacing 4.69 Angstroms) is the fourth order (OOl) diffraction plane and the (020) plane (degree two theta equals 19.32 Cu K-alpha, d-spacing 4.59 Angstroms) is the second order (OkO) diffraction plane from the talc crystallites, where l and k are integers. The convention utilized herein is that of the JCPDS International Centre for Diffraction Data 1979, Talc 19-770. Due to structural considerations, planes such as these, i.e. (OOl) and (OkO) will show the greatest differential as a function of the maximum orientation due to the talc crystal morphology, An acetone slurry is used with a glass slide to maximize the (OOl) diffraction for optimum indexing. Although there is some overlap, the proximity of the chosen planes greatly facilitates the intensity measurements. The Index, in a first version in accordance with the invention, was obtained by dividing the peak amplitude of the intensity (above background) of the (004) plane by the peak amplitude of the intensity (above background) of the (020) plane. It will be recognized that the Index, in this first version and with reference to the x-ray diffraction pattern of FIG. 9, is the ratio of a first preselected amplitude of the intensity (i.e. the peak amplitude of the intensity) of a first diffraction plane (i.e., the (004) plane); to, a second preselected amplitude of the intensity (i.e. the peak amplitude of the intensity) of a second diffraction plane (i.e., the (002) plane).

The Index in this first version is shown by the relationship:

$$TMXDI = \frac{I_x}{I_y} = \frac{I_{(004)}}{I_{(020)}} \qquad \text{Eq. 1}$$

where I = the preselected amplitude of the Intensity of the diffraction plane.

For ease of expression and in order that the Index be of a value less than or equal to one, a second version of the Index can be calculated as shown by the relationship;

$$TMXDI = \frac{I_x}{I_x + 2(I_y)} = \frac{I_{(004)}}{I_{(004)} + 2(I_{(020)})} \qquad \text{Eq. 2}$$

where I = the preselected amplitude of the Intensity of the diffraction plane.

The values for the Index for the Talc Samples of Table 1, in accordance with the first version of the Index, are shown in column X of Table 1 and, the Index values in accordance with the second version of the Index, are shown in column Y.

Figure 10:
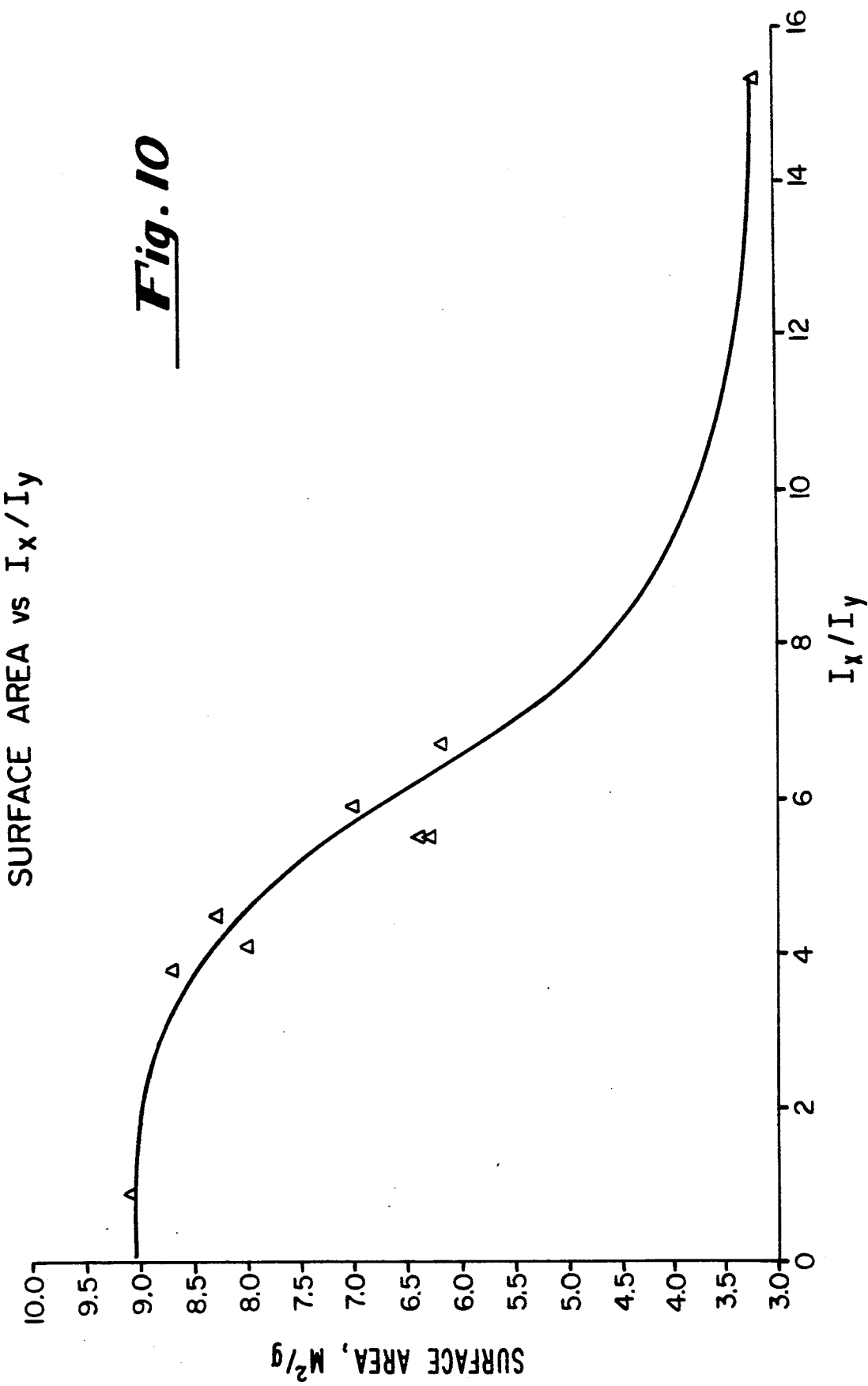
FIG. 10 is a graph of talc particle surface area (Col. W-Table 1) versus TMXDI values (Col. X-Table 1) in accordance with a first embodiment of the invention.

Referring now to FIG. 10, there is shown a graph of talc particle surface area of the Talc Samples of Table 1 versus TMXDI values (Col. X) in accordance with the first version of the TMXDI. FIG. 10 illustrates the trend of surface area versus TMXDI. The S-shaped curve shows a plateau both at the high and low surface area values. At intermediate values there exists an inverse linear relationship between the surface area and the Index or "platiness" of the Talc Sample. The high and low surface area regions of the S-curve represent thresholds at which morphology considerations become less dominant and other secondary effects, such as structural differences, take over.

Referring now to FIG. 11, there is shown a graph of talc particle surface area versus TMXDI values in accordance with the second version of the TMXDI. The curve line graph again shows an inverse non-linear relationship between the surface area and the Index of the Talc Samples.

It should be clear from the description of FIGS. 10 and 11 that variations in the Index value in the Talc Samples of Table 1, when correlated with the surface area of the Talc Samples of Table 1, are shown to be inversely related. As indicated earlier, a correlation of the talc surface area with water absorption data in the fired cordierite articles, shows an inverse relationship of water absorption capability to surface area as shown in FIG. 12 and, therefore, there is a direct relationship of water absorption capability versus the Index of the present invention as shown in FIG. 13. From the foregoing, it will be understood that water absorption capability of fired cordierite articles increases with an increase in talc particle "platiness" or a decrease in talc particle surface area.

Figure 14:
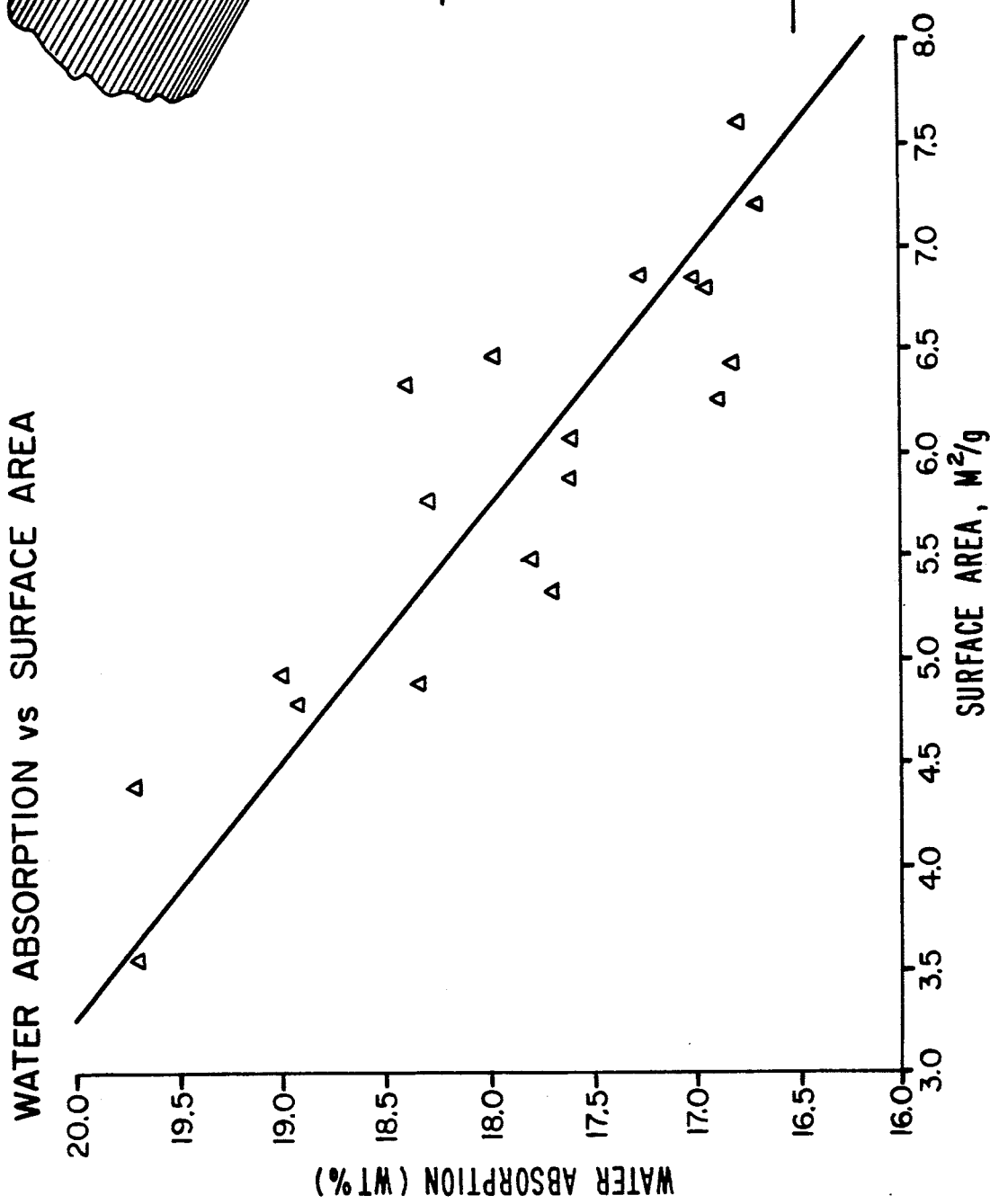
FIG. 14 is a graph of cordierite water absorption values (Col. Z-Table 3) versus a ratio of talc particle surface area (Col. X-Table 2) showing a range of talc particle surface area values for a given range of water absorption values.

Now referring to FIG. 14 and to Tables 2 and 3, there is shown in FIG. 14 Water Absorption values of a cordierite article versus surface area values of the talc Sample Compositions shown in Table 2. It is readily apparent from FIG. 14 that if a predetermined or desired Water Absorption value, as far example 18, was desired, then talc particles having a surface area of 5.5 m²/g would be selected for use in the raw material mixture. A useful range of surface areas would be 1 m²/g to 15 m²/g and preferably 3 m²/g to 8 m²/g to provide for optimum Water Absorption values in the cordierite article.

With reference now to FIG. 15 and Tables 2 and 3, there is shown in FIG. 15 Water Absorption values of a cordierite article versus TMXDI of the talc Sample Composition shown in Table 2. Again, it is readily apparent that if a predetermined or desired Water Absorption value, as for example 18, were desired, then talc particles having a TMXDI, in accordance with the second version of the TMXDI, of 0.85 would be selected for use in the raw material mixture. A useful range of TMXDI values would be 0.3 to 1.0 and preferably 0.7 to 1 to provide for optimum Water Absorption values in the cordierite article.

It will also be understood from the foregoing, that talc particle morphology can introduce variability in fired cordierite articles and, that by utilizing talc particles having a predetermined or desired Index value, the physical properties, e.g. water absorption and catalysis coatability, of the fired cordierite articles can be more readily controlled.

TABLE 1

Talc Samples Used to Define the TMXDI, Surface Area Versus Cordierite Water Absorption Relationship

| Talc Sample | Surface Area $N_2$ BET (m²/g) Col. W | TMXDI Col. X | Col. Y | Water Absorption Col. Z |
|---|---|---|---|---|
| (1) TCY | 9.1 | 0.90 | .48 | 15.7 |
| (2) TH1 | 8.8 | 3.8 | .77 | 16.4 |
| (3) TG1 | 8.3 | 4.5 | .79 | 16.6 |
| (4) TF2 | 8.0 | 4.1 | .78 | 16.8 |
| (5) TK2 | 7.0 | 5.9 | .86 | 17.7 |
| (6) TL1 | 6.4 | 5.5 | .87 | 18.3 |
| (7) TG2 | 6.2 | 6.7 | .89 | 18.5 |
| (8) TL2 | 6.3 | 5.5 | .87 | 18.2 |
| (9) TV1 | 3.1 | 15.3 | .98 | 19.1 |

TABLE 2

Batch Composition (particulate raw material mixture) Used to Define the TMXDI & Surface Area of Talc Blends Versus Cordierite Water Absorption Relationship

| Sample Composition | Talc Montana (1) | Talc Montana (2) | Talc China |
|---|---|---|---|
| (1) CA | — | 40.2 | — |
| (2) CB | 8 | 32.2 | — |
| (3) CC | 12.1 | 28.1 | — |
| (4) CD | 16.1 | 24.1 | — |
| (5) CE | 20.1 | 20.1 | — |
| (6) CF | 24.1 | 16.1 | — |
| (7) CG | 28.1 | 12.1 | — |
| (8) CH | 32.2 | 8 | — |
| (9) CI | 40.2 | — | — |
| (10) CJ | — | — | 40.2 |
| (11) CK | 8 | — | 32.2 |
| (12) CL | 12.1 | — | 28.1 |
| (13) CM | 16.1 | — | 24.1 |
| (14) CN | 20.1 | — | 20.1 |
| (15) CO | 24.1 | — | 16.1 |
| (16) CP | 28.1 | — | 12.1 |
| (17) CQ | 32.2 | — | 8 |
| (18) CR | — | 20.1 | 20.1 |
| (19) CS | 13.4 | 13.4 | 13.4 |

| Sample Composition | Calcine Kaolin | Kaolin | Alumina |
|---|---|---|---|
| (1) CA | 25.2 | 21.2 | 13.5 |
| (2) CB | 25.2 | 21.2 | 13.5 |
| (3) CC | 25.2 | 21.2 | 13.5 |
| (4) CD | 25.2 | 21.2 | 13.5 |
| (5) CE | 25.2 | 21.2 | 13.5 |
| (6) CF | 25.2 | 21.2 | 13.5 |
| (7) CG | 25.2 | 21.2 | 13.5 |
| (8) CH | 25.2 | 21.2 | 13.5 |
| (9) CI | 25.2 | 21.2 | 13.5 |
| (10) CJ | 25.2 | 21.2 | 13.5 |
| (11) CK | 25.2 | 21.2 | 13.5 |
| (12) CL | 25.2 | 21.2 | 13.5 |
| (13) CM | 25.2 | 21.2 | 13.5 |
| (14) CN | 25.2 | 21.2 | 13.5 |
| (15) CO | 25.2 | 21.2 | 13.5 |
| (16) CP | 25.2 | 21.2 | 13.5 |
| (17) CQ | 25.2 | 21.2 | 13.5 |
| (18) CR | 25.2 | 21.2 | 13.5 |
| (19) CS | 25.2 | 21.2 | 13.5 |

TABLE 3

The Talc blends used to define ranges of TMXDI and surface area for optimum water absorption of the cordierite body.

| Talc Blends* | Col. X Surface Area $N_2$BET (m²/g) | Col. Y TMXDI 2nd Method | Col. Z Water Absorption |
|---|---|---|---|
| TA | 5.77 | .86 | 18.30 |
| TB | 5.88 | .81 | 17.62 |
| TC | 6.47 | .78 | 17.99 |
| TD | 6.43 | .78 | 16.83 |
| TE | 6.26 | .76 | 16.90 |
| TF | 6.86 | .74 | 17.28 |
| TG | 6.85 | .73 | 17.02 |
| TH | 7.21 | .71 | 16.71 |
| TI | 7.60 | .71 | 16.80 |
| TJ | 3.54 | .95 | 19.70 |
| TK | 4.38 | .93 | 19.71 |
| TL | 4.78 | .88 | 18.92 |
| TM | 4.88 | .92 | 18.34 |
| TN | 5.33 | .83 | 17.70 |
| TO | 6.07 | .38 | 17.61 |
| TP | 6.33 | .87 | 18.40 |
| TQ | 6.80 | .76 | 16.96 |
| TR | 4.92 | .92 | 19.00 |
| TS | 5.48 | .89 | 17.80 |

*Talc blends used in compositions of Table 2 (e.g. TA is the talc blend of CA, TB is the talc blend of CB, etc.)

TABLE 4

Mean particle size and surface area of the batch raw materials used to define the talc/cordierite water absorption relationship.

| Batch Raw Materials | Sedigraph Mean Particle Size (μm) | Surface area $N_2$ BET (m²/g) |
|---|---|---|
| 1. Talc-TCY | 8.2 | 9.1 |
| 2. Talc-TH1 | 6.8 | 8.8 |
| 3. Talc-TG1 | 6.8 | 8.3 |
| 4. Talc-TF2 | 6.8 | 8.0 |
| 5. Talc-TK2 | 6.8 | 7.0 |
| 6. Talc-TL1 | 6.8 | 6.4 |

TABLE 4-continued

Mean particle size and surface area of the batch raw materials used to define the talc/cordierite water absorption relationship.

| Batch Raw Materials | Sedigraph Mean Particle Size (μm) | Surface area N₂ BET (m²/g) |
|---|---|---|
| 7. Talc-TG2 | 6.8 | 6.2 |
| 8. Talc-TL2 | 6.8 | 6.3 |
| 9. Talc-TV1 | 6.5 | 3.1 |
| 10. Talc-Mont. (1) | 6.8 | 7.6 |
| 11. Talc-Mont. (2) | 6.2 | 5.8 |
| 12. Talc-China | 5.6 | 3.5 |
| 13. Kaolin | 6.5 | 6.5 |
| 14. Calcined Kaolin | 1.5 | 8.0 |
| 15. alpha-Alumina | 4.5 | 0.8 |

With reference to Table 4 there is shown therein the mean particle size (Micrometrics 5000 ET model X-ray Sedigraph particle size analyzer) and surface area (N₂ BET) of the previously mentioned batch raw materials of Tables 1 and 2.

Figure 16:
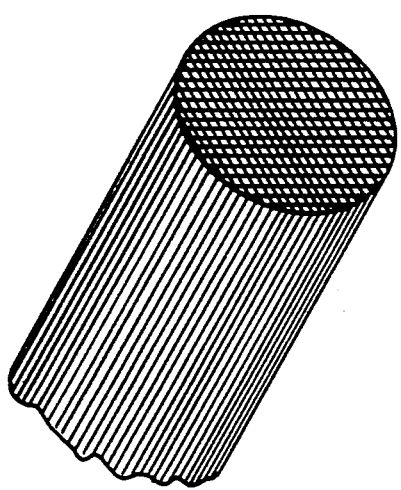
FIG. 16 is an isometric projection of a monolithic honeycombed structure having a matrix of thin walls forming a multiplicity of open-ended cells extended from one end of the structure to the other.

Referring now to FIG. 16, there is shown a isometric projection of a monolithic honeycomb structure having a matrix of thin walls forming a multiplicity of open-ended cells extended from one end of the structure to the other. It will, of course, be appreciated that cordierite articles may be formed in various shapes and widely differing profiles and may have other configurations than that shown in FIG. 16.

Although preferred embodiments of the invention have been described and various alternatives suggested, it will be apparent to those skilled in the art that various changes and modifications may be made, without departing from the true spirit and scope of the invention as set forth in the appended claims.

What is claimed is:

1. In the method for producing cordierite articles comprising the steps of:
 a) preparing a particulate raw material mixture comprised of magnesia, alumina and silica precursors;
 b) forming said raw material mixture into a desired configuration; and thereafter
 c) firing said configuration to produce a cordierite article;
the improvement of producing cordierite articles having water absorption characteristics related to a predetermined value of a Morphology X-ray Diffraction Index, which improvement comprises:
 i) selecting talc particles as the magnesia precursor in said mixture;
 ii) characterizing said talc particles in accordance with said Index to determine the Index value of said particles;
 iii) selecting talc particles having the predetermined Index value; and
 iv) utilizing the talc particles selected in step iii) in preparing the raw material mixture of step a);
wherein said Morphology X-ray Diffraction Index is equal to the ratio of
 1) a first preselected amplitude of the intensity of a first diffraction plane of an x-ray diffraction pattern of the talc particles; to
 2) the sum of a) said first preselected amplitude and b) two times a second preselected amplitude of the intensity of a second diffraction plane on the same x-ray diffraction pattern; and
wherein the ratio is in the range of 0.3 to 1.0.

2. The method of claim 1,
wherein the first diffraction plane is the (OOl) diffraction plane, and the second diffraction plane is the (OkO) diffraction plane, where l and k are integers.

3. The method of claim 2,
wherein l is equal to 4 and k is equal to 2.

4. The method of claim 1,
wherein the first preselected amplitude is the peak amplitude of the intensity of the first diffraction lane of the x-ray diffraction pattern of the talc particles; and
the second preselected amplitude is the peak amplitude of the intensity of the second diffraction plane on the same x-ray diffraction pattern.

5. The method of claim 4,
wherein the first diffraction plane is the (OOl) diffraction plane, and
the second diffraction plane is the (OkO) diffraction plane, where l and k are integers.

6. The method of claim 5
wherein l is equal to 4 and k is equal to 2.

7. The method of claim 1 wherein the Index is in the range of 0.7 to 1.0.

8. In the method for producing cordierite articles comprising the steps of:
 a) preparing a particulate raw material mixture comprised of magnesia, alumina and silica precursors;
 b) forming said raw material mixture into a desired configuration; and thereafter
 c) firing said configuration to produce a cordierite article;
the improvement of producing cordierite articles having water absorption characteristics related to a predetermined value of particle surface area, which improvement comprises:
 i) selecting talc particles as the magnesia precursor in said mixture;
 ii) characterizing said talc particles in accordance with the surface area of talc particles to determine the surface area of said talc particles;
 iii) selecting talc particles having a surface area in the range of 1 m²/g to 15 m²/g; and
 iv) utilizing the talc particles selected in step iii) in preparing the raw material mixture of step a).

9. In the method of claim 8 wherein the predetermined surface area of the talc particles is in the range of 3 m²/g to 8 m²/g.

10. The method of claim 8 wherein the talc particles utilized are 36 to 52% by weight of the raw material mixture.

11. The method of claim 8 wherein the talc particles utilized are 36 to 52% by weight of the raw material mixture, clay is 43 to 49% by weight of the raw material mixture and alumina is 13 to 24% by weight of the raw material mixture.

* * * * *

UNITED STATES PATENT AND TRADEMARK OFFICE
CERTIFICATE OF CORRECTION

PATENT NO. : 5,141,686
DATED : August 25, 1992
INVENTOR(S) : Martin J. Murtagh

It is certified that error appears in the above-indentified patent and that said Letters Patent is hereby corrected as shown below:

Column 12, line 16, "lane" should be "plane"

Signed and Sealed this

Twenty-eighth Day of September, 1993

Attest:

BRUCE LEHMAN

*Attesting Officer*     *Commissioner of Patents and Trademarks*